March 21, 1944.  A. C. ROUTH  2,344,901

METHOD AND APPARATUS FOR MAKING FLAVORED CONFECTIONS

Filed April 17, 1940

INVENTOR.
Almond C. Routh
BY
His ATTORNEY.

Patented Mar. 21, 1944

2,344,901

UNITED STATES PATENT OFFICE 2,344,901

METHOD AND APPARATUS FOR MAKING FLAVORED CONFECTIONS

Almond C. Routh, Sandusky, Ohio

Application April 17, 1940, Serial No. 330,150

5 Claims. (Cl. 107—54)

My invention relates to methods and apparatus for forming ice cream confections and the like, and relates more particularly to providing such confections with strips or cores of other materials such as fruits, nuts, syrups, or the like.

Ice cream confections of various kinds have heretofore been formed comprising an interior body of another substance than that of the main confection, as illustrated in Patent No. 2,042,940 to A. E. Herron, dated June 2, 1936.

It is an object of my invention to provide for either a "batch" freezer or a continuous freezer of any well known type, with novel means for inserting said other materials into the confection or ice cream.

Another object of my invention is to accomplish the above stated purposes in an economical and efficient manner.

Other objects of my invention and the invention itself will become increasingly apparent from a consideration of the following description and accompanying drawing, in which like parts are designated by like reference characters, and wherein.

Figure 1:
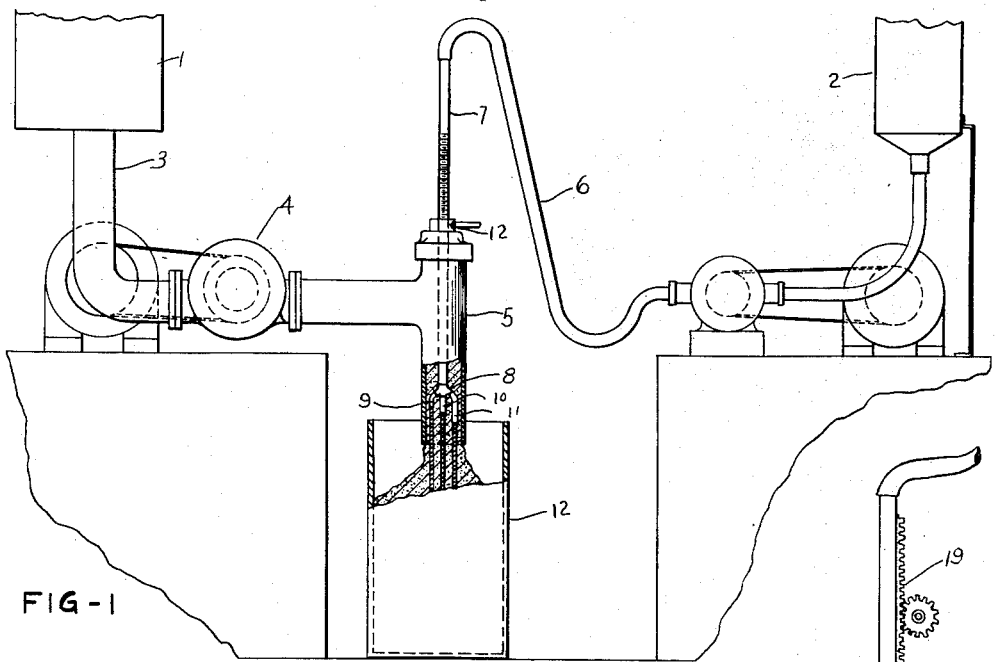
Fig. 1 is a front elevational view, partially broken away, of a preferred embodiment of my invention.

Referring to the drawing, I have shown in Fig. 1, at the left hand side of the figure, a hopper or container 1 for ice cream or the like, and at 2, on the right hand side of the figure, a container for syrup or other filling material. The hopper 1 has associated therewith, at its discharge end, a discharge pipe or conduit 3 through which the ice cream in the hopper is pumped by the pump 4 into a common conduit 5, into which syrup or other filling material is pumped from the container 2 through a tube or outlet pipe 6, and a connected discharge pipe or tube 7, which is projected through an orifice 12 into the conduit 5 into which the ice cream has also been pumped.

The syrup discharge means or outlet 7 is connected at its lowermost end to an injection nozzle 8 having a plurality preferably three in number, of downwardly extending tubular fingers 9, 10 and 11, projecting therefrom, these fingers being preferably of different lengths and disposed generally parallel to each other, the longest being spaced inwardly a short distance from the end of the common conduit 5 which, in the form shown in Fig. 1, is inserted into a container or receiver 12.

The ends of the tubular fingers in the embodiment shown in Fig. 1 are preferably flattened which prevents the syrup from drooling when filling direct-filled small packages such as pints or quarts. In Fig. 1, the syrup or ice cream nozzle or discharge tubes are shown projecting into a large can which is of the usual 5-gallon type. It is evident however, that any form of container may be utilized.

In operation, it will be readily appreciated that the ice cream is thus provided with cores of syrup or the like which are ribboned therethrough and that the packaged cream is not splattered with the flavoring but rather encloses the same in patterned effect.

It is to be understood that the weight of the ice cream, as shown in the figures herein, will cause the ice cream with its syrup or other filling material to be ribboned into the container 12 or into the package in bulk whichever container is employed so as to give a variegated effect to the ice cream. I contemplate further that a plurality of filling nozzles or discharge means, such as 7, might be projected within the ice cream nozzle in such a manner as to deposit different materials or different colored materials within the ice cream body.

Figures 2, 3, 4:
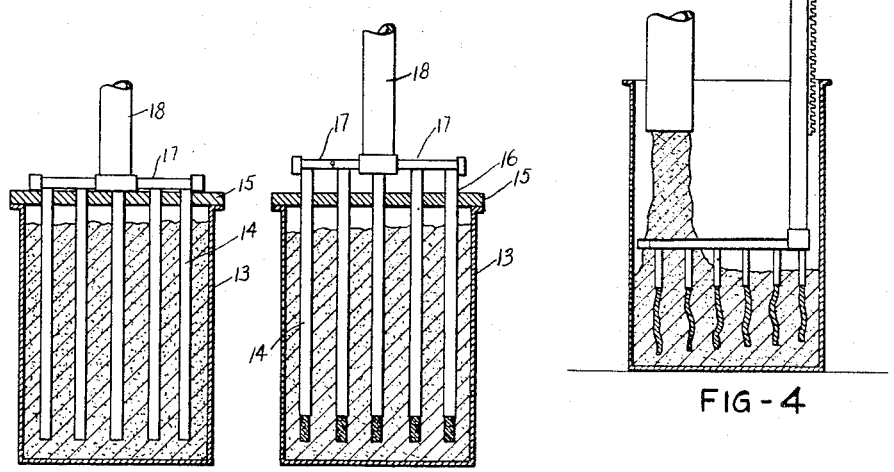
Figs. 2 and 3 are sectional views of another embodiment of my invention.
Fig. 4 is a transverse sectional view of a third embodiment of my invention, similar to the embodiment illustrated in Figs. 2 and 3.

In the form shown in Figs. 2 and 3, a container, of the type usually employed for the purpose of storing ice cream, such as a 5-gallon can, 13 is filled, preferably about 90%, although any relative proportions might be employed, full of ice cream and then the ice cream inlet or syrup nozzles 14 are brought into contact with the partially filled can of ice cream. A flat cover plate 15 is employed in this form and is preferably perforated as at 16 to accommodate a plurality of injection nozzles 14 which are projected therethrough, said nozzles being secured to a common conduit 17 and 18 whereby when the plate 15 is clamped down on top of the container or can 13 and the injection nozzles 14, which preferably are of a length substantially equal to the depth of the container, projected therethrough, the lowering of their associate conduit and the plate covers the top of the can and the fingers or nozzles are pressed longitudinally throughout the bulk of the ice cream. Upon the application of pressure from a pump, not shown, syrup or other filling material is pumped downwardly to the bottom of the fingers filling the same and displacing any ice cream which has been forced up in said fingers or injection nozzles, whereby the filling material completely fills said injection nozzles and upon progressive withdrawal of the fingers or nozzles from the ice cream by elevation of the conduit, etc., the syrup is deposited in the cores formed, in effect, in the ice cream by the projection of the nozzles therethrough.

In this form, the quantity of ice cream which is placed in the container would preferably be such that when it is forced upwardly or displaced in the container by the injection of the syrup therein that the container would then be filled. In the form shown in Fig. 4, a pump and ratchet arrangement is shown and the ratcheting arrangement, such as is shown at 19, is preferably timed with the pump pressure so that a proper cooperative relationship is maintained between the depositing of ice cream in the container and the withdrawal of the syrup containing fingers from the container, the fingers or nozzles preferably following the ice cream or, stated in a different manner, being continually disposed a short distance below the level of the ice cream deposited in the container.

Figure 5:
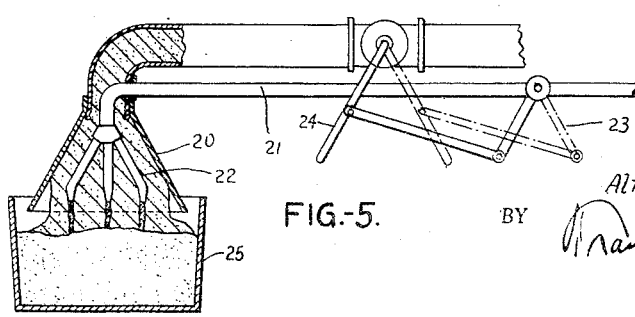
Fig. 5 is a sectional view of another embodiment of my invention, showing parts partially broken away.

In the form shown in Fig. 5, it will be noted that I show syrup injection nozzles 20 of the type employed in my Patent No. 2,160,285, granted May 5, 1939, and project the tube 21 into the nozzle or funnel 20 through a side wall of a cream conduit discharging therein and that said tube 21 is provided with fingers 22—22—22 similar to those shown in Fig. 1 of the present application.

A pair of linked lever arm connections 23 and 24, disposed on the filling tube and the ice cream conduit respectively, may be employed in connection with the invention, shown in this figure of the drawing, whereby the movement of the ice cream and the filling material may be controlled or shut off.

In the form shown in Fig. 5, ice cream and filling material are adapted to simultaneously be deposited into packages of the type shown at 25, although any container may be employed in connection therewith. It is to be noted that in this form the injection nozzles are shown therein having their ends swaged inwardly and the nozzles are further shown as spaced inwardly a short distance from the end of the funnel 20.

I am aware that numerous and extensive departures may be made without departing from the spirit of my invention or the scope of the appended claims, although I have described a preferred embodiment thereof.

I claim:

1. In an ice cream confection making apparatus, an extrusion nozzle adapted to be secured at one end to an ice cream making apparatus to have ice cream frozen to plastic consistency, supplied under pressure to said nozzle end and to be extruded therefrom, a filler nozzle having two or more downwardly extending tubular fingers of different length and disposed generally parallel to each other, the ends of said tubular fingers being flattened and spaced inwardly from the end of said ice cream nozzle, whereby said ice cream upon extrusion is adapted to have several streams of filling material disposed therein in ribboned effect.

2. The method of making a flavored confection of the character described which comprises partially filling a container with a frozen substance, projecting a plurality of filling nozzles therein, pumping filling material under pressure into said nozzles and withdrawing said nozzles from said frozen material whereby cores of said filling material are disposed within said frozen material, adding additional frozen material thereto concurrently with the pumping of filling material whereby the mass of said further frozen material effects the disposition of said filling material throughout the cream.

3. The method of forming a flavored confection which comprises projecting a filling nozzle into a body of frozen material, extruding the filling under pressure into said frozen material, adding further frozen material thereto and further filling material whereby said frozen material is provided with cores of filling material, the weight of the frozen material and the flavored material causing the frozen confection to be ribboned in the container whereby the said material is given a variegated effect.

4. The method of making flavored confections of the character described which comprises partially filling a container with a frozen substance, projecting a plurality of filling nozzles therein, pumping further frozen substance into the container and injecting filling material concurrently therewith under pressure into said nozzles, withdrawing said nozzles from the container a short distance inwardly of the changing level of the frozen substance in the container, whereby said frozen substance is provided with streams of said filling material.

5. The method of making flavored confections of the character described which comprises partially filling a container with a frozen substance, projecting a plurality of filling nozzles therein, pumping further frozen substance into the container and injecting filling material under pressure concurrently therewith into said nozzles, the flow of the frozen material into the container and the filling material into the frozen substance being controlled in relation to each other whereby upon withdrawal of said nozzles from the container the filling material is disposed a short distance inwardly of the changing level of the frozen substance in the container, whereby said frozen substance is provided with streams of said filling material.

ALMOND C. ROUTH.